United States Patent
Yoshida et al.

(10) Patent No.: US 8,144,982 B2
(45) Date of Patent: Mar. 27, 2012

(54) IMAGE PROCESSING DEVICE THAT ADJUSTS SPECIFIC COLOR OF COLOR IMAGE

(75) Inventors: Yasunari Yoshida, Aichi-ken (JP); Masaki Kondo, Toyoake (JP); Takeshi Watanabe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 898 days.

(21) Appl. No.: 11/492,005

(22) Filed: Jul. 25, 2006

(65) Prior Publication Data

US 2007/0019860 A1  Jan. 25, 2007

(51) Int. Cl.
 *G06K 9/00* (2006.01)
(52) U.S. Cl. ........ 382/167; 382/274; 345/601; 345/602; 358/520
(58) Field of Classification Search .................. 382/167, 382/274, 162; 345/601, 602; 358/520
See application file for complete search history.

(56) References Cited

U.S. PATENT DOCUMENTS

| | | | | |
|---|---|---|---|---|
| 4,488,245 | A * | 12/1984 | Dalke et al. | 382/167 |
| 7,092,122 | B2 * | 8/2006 | Iwaki | 358/1.9 |
| 7,142,712 | B2 | 11/2006 | Maruoka et al. | |
| 7,242,800 | B2 * | 7/2007 | Iguchi et al. | 382/167 |
| 7,251,056 | B2 * | 7/2007 | Matsushima | 358/1.9 |
| 7,369,285 | B2 * | 5/2008 | Morikawa | 358/521 |
| 2004/0057632 | A1 * | 3/2004 | Gindele | 382/274 |
| 2004/0239814 | A1 | 12/2004 | Hirashima et al. | |
| 2004/0240729 | A1 * | 12/2004 | Cooper et al. | 382/162 |

FOREIGN PATENT DOCUMENTS

| | | |
|---|---|---|
| JP | 2-96477 A | 4/1990 |
| JP | 2000-92337 | 3/2000 |
| JP | 2002-281327 | 9/2002 |
| JP | 2003-69825 A | 3/2003 |
| JP | 2004-356930 | 12/2004 |

OTHER PUBLICATIONS

Eung Joo Lee, Automatic Flesh Tone Reappearance for Color Enhancement in TV, 1997m Tongmyong University of Information Technology.*
Japanese Office Action issued in corresponding Japanese Patent Application No. JP 2005-213752, dated Jul. 3, 2007.

* cited by examiner

*Primary Examiner* — Wesley Tucker
*Assistant Examiner* — Mark Roz
(74) *Attorney, Agent, or Firm* — Baker Botts L.L.P.

(57) ABSTRACT

An adjusting portion adjusts values of lightness, chroma, and hue. A change-amount setting portion sets an amount of change for each of lightness, chroma, and hue. A weighting-curve storing portion stores weighting curves for each of lightness, chroma, and hue. A weighting-factor determining portion determines, based on the weighting curves, weighting factors for the values of lightness, chroma, and hue. A specific-color-index determining portion determines a specific color index by multiplying each of the weighting factors determined by the weighting-factor determining portion. An adjustment-amount determining portion determines an adjustment amount by multiplying, by the specific color index, the amount of change set by the change-amount setting portion, and determines adjusted values of lightness, chroma, and hue based on the adjustment amount. An adjusted-color-image obtaining portion obtains an adjusted color image based on the adjusted values.

2 Claims, 8 Drawing Sheets

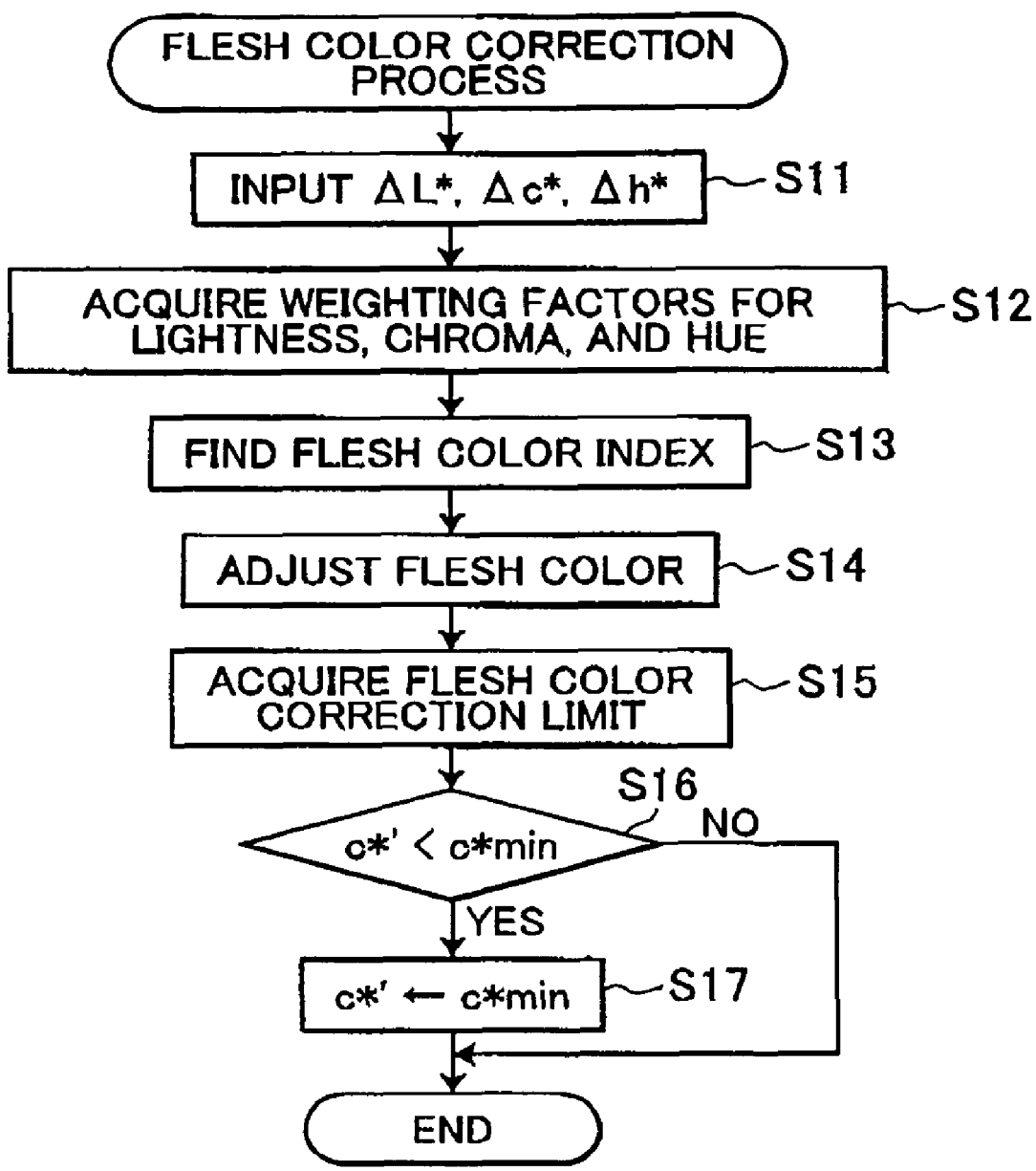

| | INPUT DATA | | | PRE-CORRECTION | | | POST-CORRECTION | | | CHROMA | |
|---|---|---|---|---|---|---|---|---|---|---|---|
| | R | G | B | L | c | | L | c | | CORRECTION AMOUNT | COMPRESSION RATIO |
| FLESH COLOR | 240 | 176 | 144 | 77.8 | 33.2 | | 82.8 | 22.7 | | −10.5 | 0.68 |
| DARK DYED-BROWN | 64 | 48 | 32 | 19.8 | 16.3 | | 19.8 | 3.9 | | −12.4 | 0.24 |
| MAINSTREAM DYED-BROWN | 80 | 48 | 32 | 22.4 | 24 | | 22.4 | 9 | | −15 | 0.38 |

IMAGE PROCESSING DEVICE THAT ADJUSTS SPECIFIC COLOR OF COLOR IMAGE

CROSS REFERENCE TO RELATED APPLICATIONS

This application claims priority from Japanese Patent Application No. 2005-213752 filed Jul. 25, 2005. The entire content of the priority application is incorporated herein by reference.

TECHNICAL FIELD

The disclosure relates to an image processing device, an image processing program, and an image processing method for adjusting a specific color of a color image in harmony with the other colors.

BACKGROUND

Digital cameras and video cameras seeing widespread use in recent years are being offered with improved performance and lower prices. Images taken with these cameras can be outputted to a color printer, such as an inkjet printer, to be printed or can be displayed on a color display device, such as an LCD.

Among the colors displayed on the display device, there exist "memory colors" such as flesh color visualized by humans to be the color of human skin. It is desirable to adjust these memory colors to approach the color visualized by humans rather than a color that is faithful to the object.

Japanese Patent Application Publication No. 2-96477 discloses a color adjusting device capable of locally adjusting a color gamut for reproducing a memory color, such as the flesh color gamut.

SUMMARY

However, since the color adjusting device in Japanese Patent Application Publication No. 2-96477 does not consider brightness when identifying the flesh color gamut, the device is incapable of naturally adjusting light areas and dark areas of flesh colors and of adjusting colors in border areas between flesh colors and colors different from the flesh color adjacent to the flesh color gamut. When processing images of a human face in particular, it has been difficult to adjust colors naturally at border areas between the skin and dark regions, such as the eyebrows and areas adjacent to the neck.

Further, when adjusting flesh colors with dyed-brown hair (a color of hair common in Japan, resulting from dying or bleaching black hair to produce a lighter brown color; hereinafter referred to simply as "dyed-brown"), the color of the hair is adjusted very little, becoming more saturated (i.e., having higher chroma) and taking on a red tinge.

In view of the foregoing, it is an object of one aspect of the invention to provide an image processing device, an image processing program, and an image processing method capable of adjusting specific colors and color areas adjacent to these specific colors to natural colors.

In order to attain the above and other objects, one aspect of the invention provides an image processing device. The image processing device includes an inputting portion, a converting portion, an adjusting portion, and an adjusted-color-image obtaining portion. The inputting portion inputs image data of a color image. The image data is in a form of combinations of values for a plurality of base colors. The color image includes a first specific color and a second specific color. The converting portion converts the image data inputted by the inputting portion to values of lightness, chroma, and hue. The adjusting portion adjusts the values of lightness, chroma, and hue converted by the converting portion. The adjusting portion includes a change-amount setting portion, a weighting-curve storing portion, a weighting-factor determining portion, a specific-color-index determining portion, and an adjustment-amount determining portion. The change-amount setting portion sets an amount of change for each of lightness, chroma, and hue. The weighting-curve storing portion stores weighting curves for each of lightness, chroma, and hue. The weighting curve for lightness includes a first section in which a weighting factor increases monotonically from a value less than one to one, a second section defined between a value indicating the second specific color and a value indicating the first specific color in which the weighting factor is one, and a third section in which the weighting factor decreases monotonically from one to a value less than one. The weighting curve for each of chroma and hue includes a first section in which the weighting factor increases monotonically from zero to one, a second section defined at a value indicating either the first specific color or the second specific color in which the weighting factor is one, a third section in which the weighting factor decreases monotonically from one to zero, and a fourth section in which the weighting factor is zero. The weighting-factor determining portion determines, based on the weighting curves, weighting factors for the values of lightness, chroma, and hue converted by the converting portion. The specific-color-index determining portion determines a specific color index by multiplying each of the weighting factors determined by the weighting-factor determining portion. The adjustment-amount determining portion determines an adjustment amount by multiplying, by the specific color index, the amount of change set by the change-amount setting portion, and determines adjusted values of lightness, chroma, and hue based on the adjustment amount. The adjusted-color-image obtaining portion obtains an adjusted color image based on the adjusted values of lightness, chroma, and hue determined by the adjusting portion.

According to another aspect, the invention also provides an image processing device. The image processing device includes an inputting portion, a converting portion, an adjusting portion, and an adjusted-color-image obtaining portion. The inputting portion inputs image data of a color image. The image data is in a form of combinations of values for a plurality of base colors. The color image includes a first specific color and a second specific color. The converting portion converts the image data inputted by the inputting portion to values of lightness, chroma, and hue. The adjusting portion adjusts the values of lightness, chroma, and hue converted by the converting portion. The adjusting portion includes a change-amount setting portion, a weighting-curve storing portion, a weighting-factor determining portion, a specific-color-index determining portion, and an adjustment-amount determining portion. The change-amount setting portion sets an amount of change for each of lightness, chroma, and hue. The weighting-curve storing portion stores weighting curves for each of lightness, chroma, and hue. The weighting curve for lightness includes a first section in which a weighting factor increases monotonically from a value less than one to one, a second section defined at a value indicating the second specific color in which the weighting factor is one, a third section in which the weighting factor decreases monotonically from one to a predetermined value greater than zero and less than one, a fourth section defined at a value indicating the first specific color in which the weighting factor is the predetermined value, and a fifth section in which the weighting factor decreases monotonically from the predetermined value to a value less than the predetermined value. The weighting curve for each of chroma and hue includes a first section in which the weighting factor increases monotonically from zero to one, a second section defined at a value indicating either the first specific color or the second specific color in which the weighting factor is one, a third section in which the weighting factor decreases monotonically from one to zero, and a fourth section in which the weighting factor is zero. The weighting-factor determining portion determines, based on the weighting curves weighting factors for the values of lightness, chroma, and hue converted by the converting portion. The specific-color-index determining portion determines a specific color index by multiplying each of the weighting factors determined by the weighting-factor determining portion. The adjustment-amount determining portion determines an adjustment amount by multiplying, by the specific color index, the amount of change set by the change-amount setting portion, and determines adjusted values of lightness, chroma, and hue based on the adjustment amount. The adjusted-color-image obtaining portion obtains an adjusted color image based on the adjusted values of lightness, chroma, and hue determined by the adjusting portion.

According to another aspect, the invention also provides a storage medium storing a set of program instructions executable on an image processing device. The instructions include inputting image data of a color image, the image data being in a form of combinations of values for a plurality of base colors, the color image including a first specific color and a second specific color, converting the image data inputted in the inputting step to values of lightness, chroma, and hue, adjusting the values of lightness, chroma, and hue converted in the converting step, and obtaining an adjusted color image based on the adjusted values of lightness, chroma, and hue determined in the adjusting step. The adjusting step includes setting an amount of change for each of lightness, chroma, and hue, determining, based on weighting curves stored in a weighting-curve storing portion, weighting factors for the values of lightness, chroma, and hue converted in the converting step, determining a specific color index by multiplying each of the weighting factors determined in the step of determining weighting factors, and determining an adjustment amount by multiplying, by the specific color index, the amount of change set in the step of setting an amount of change, and determining adjusted values of lightness, chroma, and hue based on the adjustment amount. The weighting-curve storing portion stores the weighting curves for each of lightness, chroma, and hue. The weighting curve for lightness includes a first section in which a weighting factor increases monotonically from a value less than one to one, a second section defined between a value indicating the second specific color and a value indicating the first specific color in which the weighting factor is one, and a third section in which the weighting factor decreases monotonically from one to a value less than one. The weighting curve for each of chroma and hue includes a first section in which the weighting factor increases monotonically from zero to one, a second section defined at a value indicating either the first specific color or the second specific color in which the weighting factor is one, a third section in which the weighting factor decreases monotonically from one to zero, and a fourth section in which the weighting factor is zero.

According to another aspect, the invention also provides an image processing method. The image processing method includes inputting image data of a color image, the image data being in a form of combinations of values for a plurality of base colors, the color image including a first specific color and a second specific color, converting the image data inputted in the inputting step to values of lightness, chroma, and hue, adjusting the values of lightness, chroma, and hue converted in the converting step, and obtaining an adjusted color image based on the adjusted values of lightness, chroma, and hue determined in the adjusting step. The adjusting step includes setting an amount of change for each of lightness, chroma, and hue, determining, based on weighting curves stored in a weighting-curve storing portion, weighting factors for the values of lightness, chroma, and hue converted in the converting step, determining a specific color index by multiplying each of the weighting factors determined in the step of determining weighting factors, and determining an adjustment amount by multiplying, by the specific color index, the amount of change set in the step of setting an amount of change, and determining adjusted values of lightness, chroma, and hue based on the adjustment amount. The weighting-curve storing portion stores the weighting curves for each of lightness, chroma, and hue. The weighting curve for lightness includes a first section in which a weighting factor increases monotonically from a value less than one to one, a second section defined between a value indicating the second specific color and a value indicating the first specific color in which the weighting factor is one, and a third section in which the weighting factor decreases monotonically from one to a value less than one. The weighting curve for each of chroma and hue includes a first section in which the weighting factor increases monotonically from zero to one, a second section defined at a value indicating either the first specific color or the second specific color in which the weighting factor is one, a third section in which the weighting factor decreases monotonically from one to zero, and a fourth section in which the weighting factor is zero.

BRIEF DESCRIPTION OF THE DRAWINGS

Illustrative aspects in accordance with the invention will be described in detail with reference to the following figures wherein:

FIG. 7 is a flowchart illustrating steps in a flesh color correction process according to a second aspect;

DETAILED DESCRIPTION

Figure 1:
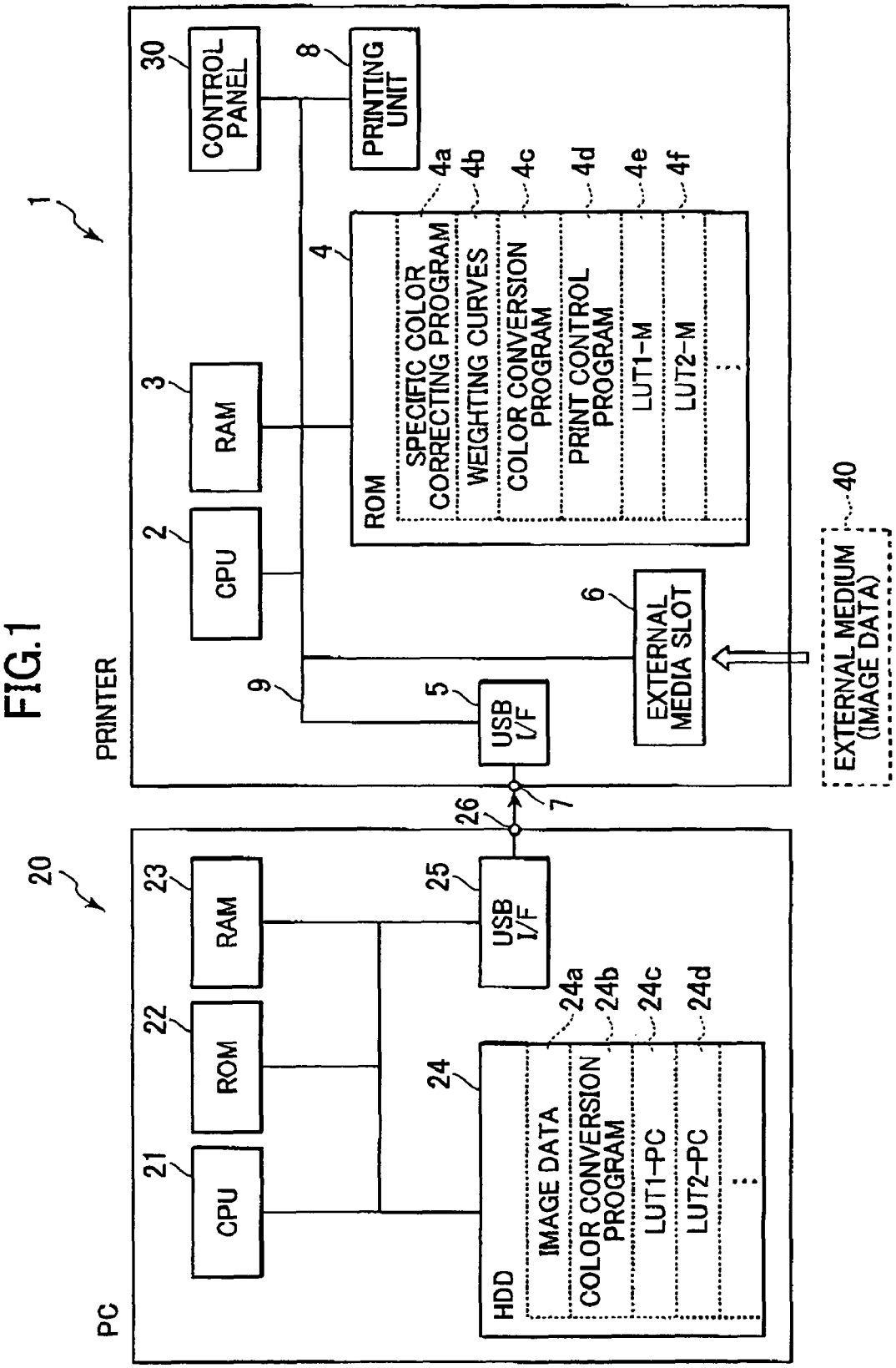
FIG. 1 is a block diagram showing the electrical structure of a printer and a personal computer according to a first aspect of the invention.

An image processing device, an image processing program, and an image processing method according to a first aspect of the invention will be described while referring to the accompanying drawings. FIG. 1 is a block diagram showing the electrical structure of a printer 1, and a personal computer 20 connected to the printer 1. The printer 1 functions to convert image data inputted from the personal computer 20 or image data recorded on an external medium 40 mounted in an external media slot 6 of the printer 1 to print data, and to print the print data.

The printer 1 includes a CPU 2, a RAM 3, a ROM 4, a USB interface 5, a USB terminal 7, the external media slot 6, a control panel 30, and a printing unit 8, all of which are connected together via a bus 9.

The CPU 2 is a microprocessor that functions to execute various programs stored in the ROM 4. The RAM 3 is memory having a work area in which the CPU 2 temporarily stores variables and the like when executing the various programs. The ROM 4 is read-only memory that stores the various programs executed by the CPU 2, and constants and tables that the CPU 2 references when executing the programs.

The ROM 4 stores such control programs as a specific color correcting program 4a, weighting curves 4b, a color conversion program 4c and a print control program 4d; and such conversion tables as a look-up table LUT1-M 4e and LU2-M 4f.

The specific color correcting program 4a is used to perform a process to find weighting factors for the three parameters lightness (L*), chroma (c*), and hue (h*) to obtain a specific color index, and for multiplying the specific color index by amounts of change set by the user and the like in order to correct values for each of the parameters lightness (L*), chroma (c*), and hue (h*).

The weighting curves 4b are curves showing the weighting factors for the three parameters lightness (L*), chroma (c*), and hue (h*) referenced when executing the specific color correcting program 4a. The weighting curves 4b may be conversion tables storing graphs numerically, or arithmetic expressions.

The color conversion program 4c is used to convert RGB values or the like inputted as color image data to optimal values for printing on the printer 1. For example, the program uses an optimal look-up table or the like to convert the RGS values to CMYK values suitable for the type of ink used in printing, the type of sheet material on which printing is performed, the printing resolution, and the like.

The print control program 4d controls driving mechanisms and the like for driving a carriage supporting a print head of the printing unit 8 and for driving the sheet material based on print data converted by the color conversion program 4c.

The look-up table LUT1-M 4e is a conversion table for performing ICC sRGB profile conversion by inputting combinations of values for the three base colors R (red), G (green), and B (blue). The look-up table LU2-M 4f is a conversion table for converting inputted combinations of the three base colors used in the image data (RGB) to print data (CMYK) for printing. The ROM 4 stores a plurality of look-up tables corresponding to types of ink and types of sheet material used in printing, printing resolution, and the like.

The USB interface 5 enables the printer 1 to communicate with the personal computer 20 via a USB cable connected to the USB terminal 7. Print data (CMYK) can be inputted here for performing printing operations from the personal computer 20.

The external media slot 6 can receive a detachably mounted external medium 40 storing image data taken by a digital camera or the like. The external media slot 6 directly inputs this image data (RGB) from the inserted external medium 40.

Though not shown in the drawings, the printing unit 8 includes a carriage, a print head, and ink tanks for each color cyan, magenta, yellow, and black. The carriage moves over the sheet material subjected to a printing operation, while the print head supported on the carriage ejects ink supplied from the ink tanks at predetermined positions on the sheet material. The control panel 30 enables the user to perform various settings on the printer 1. The control panel 30 will be described later with reference to FIGS. 2A and 2B.

The personal computer 20 includes a CPU 21, a ROM 22, a RAM 23, a hard disk drive (HDD) 24, a USB interface 25, and a USS terminal 26. The CPU 21 is a microprocessor for executing various programs stored in the ROM 22 and hard disk drive 24. The RAM 23 is memory having a work area in which variables and the like are temporarily stored when the CPU 21 executes the various programs.

The hard disk drive 24 is a non-volatile memory having a large storage capacity. The hard disk drive 24 stores operating system software, image data 24a taken by a digital camera or the like, a color conversion program 24b, and look-up tables 24c and 24d.

The image data 24a is data inputted from a digital camera via the USB interface 25 and stored in the hard disk drive 24. The color conversion program 24b is a program known as a printer driver and functions to convert RGB values in the image data 24a into CMYK values by referencing the look-up tables 24c and 24d in order to print the image data 24a.

The look-up tables 24c and 24d serve to convert three-dimensional data expressed as RGB values to four-dimensional data expressed as CMYK values. The color conversion program 24b and the look-up tables 24c and 24d are configured for performing processes adapted with the printer 1 being used and may be provided on a CD-ROM or the like included with the printer 1. The personal computer 20 reads this data from the CD-ROM drive (not shown) and stores the data on the hard disk drive 24. The personal computer 20 may also be equipped with a communication interface (not shown) for downloading this data via the Internet or other network.

The USB interface 25 facilitates communications with an external device via a USB cable connected to the USB terminal 26. Hence, the USB interface 25 can input image data taken by a digital camera, output print data for printing on the printer 1, and receive image data read by a scanning function of the printer 1.

Figure 2A:
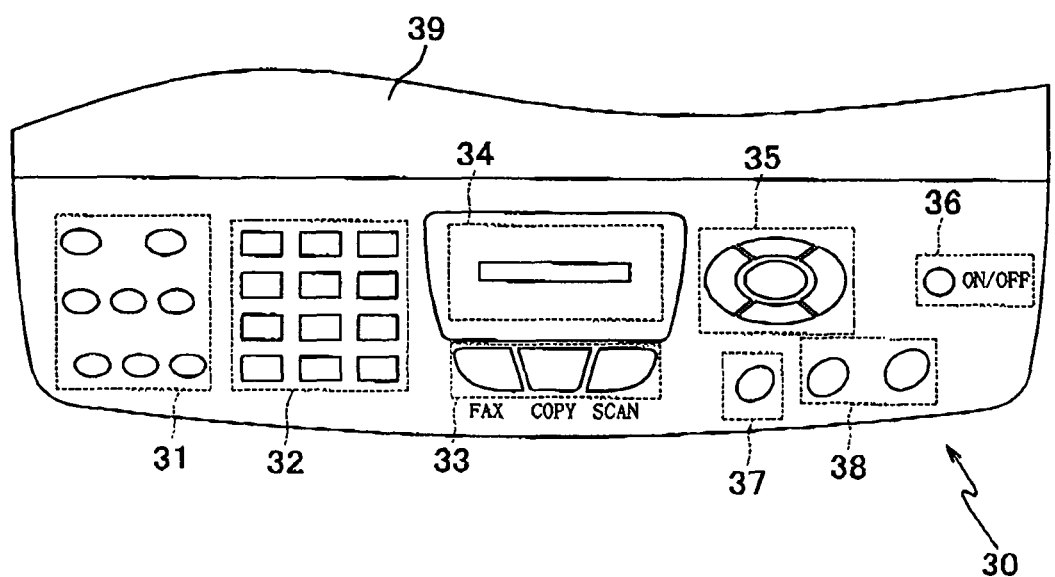
FIG. 2A is a plan view showing a panel region on the exterior of the printer.
Figure 2B:
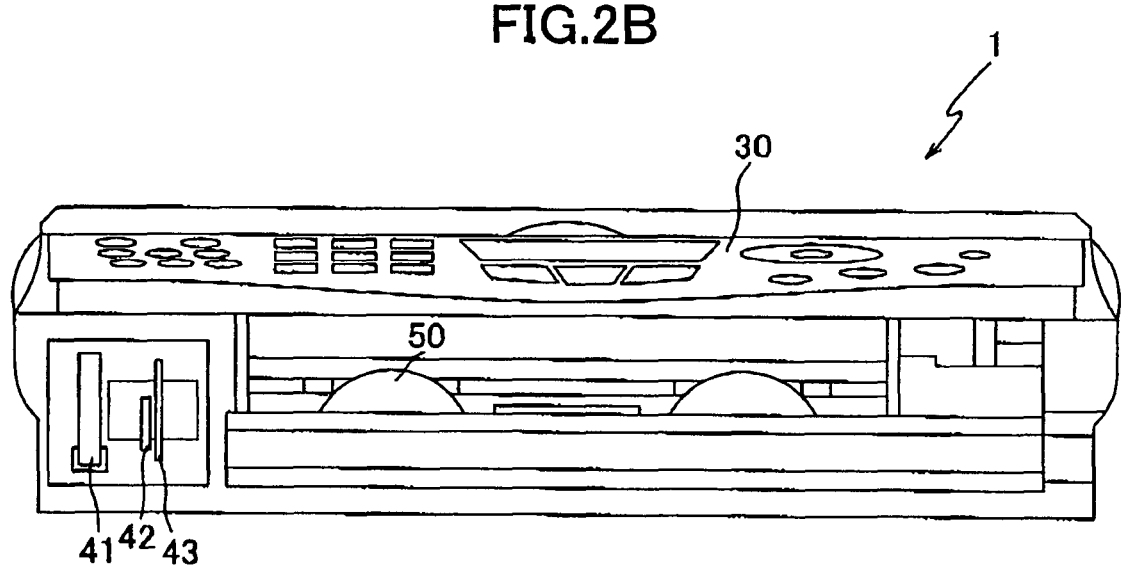
FIG. 2B is a front view showing the panel region on the exterior of the printer.

FIG. 2A is a plan view and FIG. 2B is a front view showing a region of the printer 1 around the control panel 30. The printer 1 is a multifunction device capable of performing facsimile, copier, and scanning functions that may be selected using switches 33 provided in the control panel 30. However, when receiving image data from the personal computer 20, the printer 1 is configured to execute a printing operation regardless of which function has been selected.

The control panel 30 also includes setting switches 31 that the user operates to perform various settings for each function; dialing buttons 32 used for inputting a facsimile number as the destination for transmitting a facsimile; and a display unit 34 configured of a liquid crystal display for displaying the status of settings and the like. The user can also select functions displayed on the display unit 34 by moving a cursor within the display and the like.

Cursor keys 35 are also provided in the display unit 34 moving the cursor displayed on the display unit 34 in order to select functions displayed thereon. To adjust specific colors, the user operates the cursor keys 35 to display, on the display unit 34a, screen used for adjusting a specific color, selects the specific color to be adjusted, sets the amounts of change for the three parameters lightness (L*), chroma (c*), and hue (h*), and issues a command to perform the color adjustment.

The control panel 30 also includes an ON/OFF switch 36, for turning the printer 1 on and off; a stop button 37 to issue a halt command during the execution of a function; a start button 38 for issuing a start command to execute a facsimile or copier function; and a flat bed 39 having a surface on which an original is placed in order to scan an image on the original for the copier, facsimile, and scanner functions.

Formed in the front surface of the printer 1 are a discharge tray 50 for receiving sheet material discharged after a printing operation, and external media slots for receiving various external media. As shown in FIG. 2B, the external media slots include a CompactFlash (registered trademark) slot 41, a Memory Stick (registered trademark) slot 42, and a Smart-Media (registered trademark) slot 43.

Next, a method of specific color adjustment will be conceptually described with reference to FIGS. 3A through 3C. When adjusting a specific color in the method of the present disclosure, first weighting factors are found for the three parameters lightness (L*), chroma (c*), and hue (h*) specifying the specific color, and the product of the weighting factors is used as an index for the specific color. The user-specified amounts of change for changing the parameters are adjusted by multiplying these amounts of change by the index.

Figure 3A:
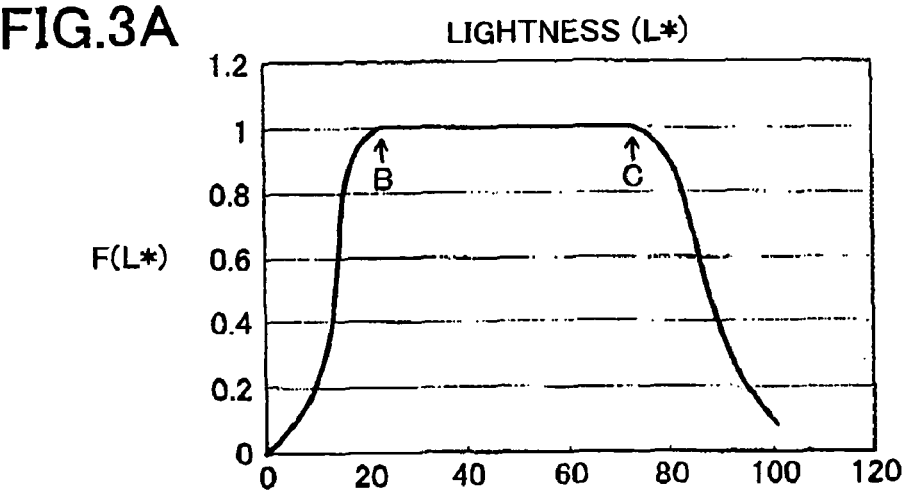
FIG. 3A is a graph showing a weighting factor for lightness (L*)
Figure 3B:
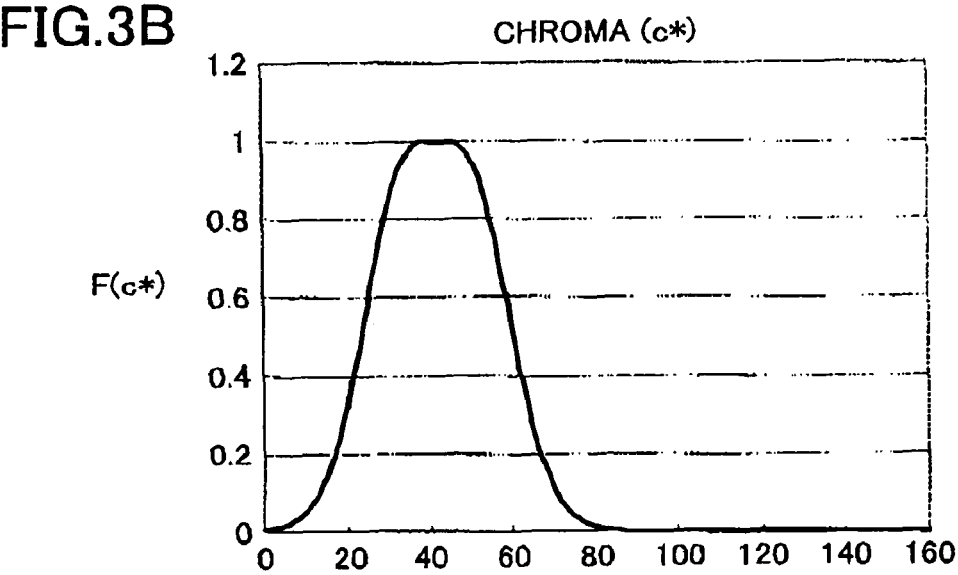
FIG. 3B is a graph showing a weighting factor for chroma (c*)
Figure 3C:
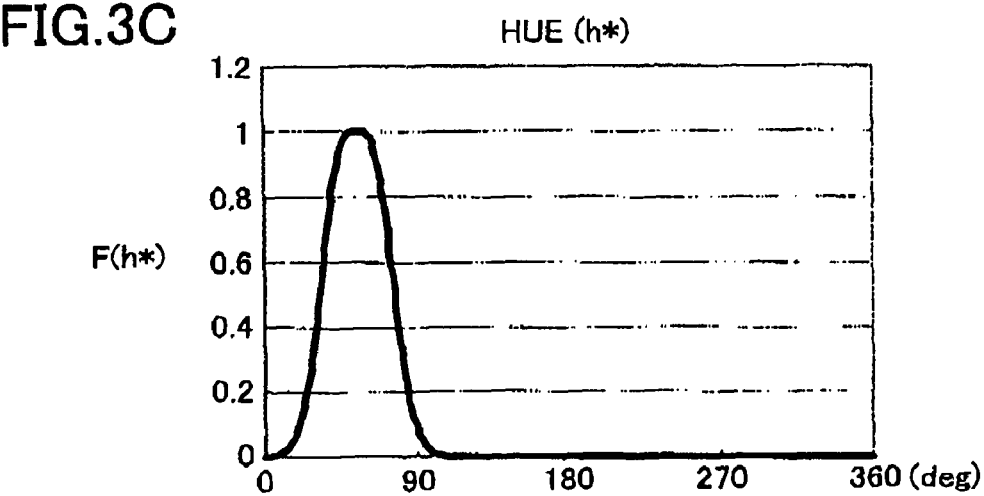
FIG. 3C is a graph showing a weighting factor for hue (h*)

FIGS. 3A through 3C are graphs in which the X-axis represents an inputted value for one of the parameters lightness (L*), chroma (c*), and hue (h*), and the Y-axis represents the weighting factor F for that parameter. FIG. 3A is a graph showing the relationship between inputted lightness (L*), represented by the X-axis, and the weighting factor F(L*) for lightness (L*), represented by the Y-axis. The lightness (L*) is a value between 0 and 100, while the weighting factor F(L*) is a value between 0 and 1.

As shown in the graph of FIG. 3A, the weighting factor F(L*) is 1 when the lightness (L*) is between points B and C, that is, a range from approximately 20 to 80. When the L* is in the range from 0 to approximately 20, the F(L*) follows a monotonically increasing curve that gently increases from 0 or a value less than 1 and connects to the point B. When the L* is in the range from point C and above, the F(L*) follows a monotonically decreasing curve that decreases gently to a value less than 1. The F(L*) is set to a predetermined value greater than 0 when the L* is the maximum value of 100.

In other words, the weighting curve for lightness (L*) includes a first section (the L* is in the range from 0 to approximately 20) in which the weighting factor F(L*) increases monotonically from a value less than 1 (zero in this example) to 1, a second section (the L* is in the range from approximately 20 to 80) defined between a value indicating dyed-brown and a value indicating flesh color in which the weighting factor F(L*) is 1, and a third section (the L* is in the range from approximately 80 to 100) in which the weighting factor F(L*) decreases monotonically from 1 to a value less than 1.

Accordingly, the F(L*) has a certain degree of magnitude (i.e., non-zero) when L* approaches 100 and, therefore, modifies the lightness (L*) by a certain degree based on the user-specified amount of change. When the lightness (L*) is high, the amount of ink used in printing is low. Therefore, if the amount of change is small, there is a danger that the adjustment amount may be discarded. By setting the F(L*) to a certain degree of magnitude as described above, it is possible to perform satisfactory correction when the value of the lightness (L*) is great.

In the graph of FIG. 3A, the largest amount of dyed-brown color is achieved at point B when the L* is approximately 20, while the largest amount of flesh color is achieved at point C when the L* is approximately 80. Hence, the F(L*) is set to 1 within the range of lightness (L*) for displaying flesh color and dyed-brown color. For values of L* outside of this range, the F(L*) is set to either a monotonically increasing function or a monotonically decreasing function between this range and the value 0 or the value greater than 0. The monotonically increasing or monotonically decreasing functions should be gradually changing S-shaped or reverse S-shaped functions, as shown in FIG. 3A. Here, a sine or cosine function may be used to form this S-shaped or reverse S-shaped curve.

When using a sine function, the weighting factor Y can be expressed by $Y=\sin(aL^*)/2+0.5$, where a is a constant.

The S-shaped or reverse S-shaped function may be a Gaussian function, or a function using a polynomial expression of third order or greater. Arithmetic expressions for these functions may be stored in the ROM 22 or the like and used to find each weighting factor. Alternatively, instead of using arithmetic expressions, it is possible to store look-up tables generated from these functions or arbitrarily drawn curves in the ROM 22 or the like and to find each weighting factor by referencing the look-up tables.

FIG. 3B is a graph showing a weighting factor F(c*) for chroma (c*), where the X-axis represents chroma (c*), and the Y-axis represents the weighting factor F(c*). The chroma (c*) takes a value from 0 to a value greater than 160, but only values of chroma from 0 to 160 are indicated in the graph. As with the weighting factor F(L*), the weighting factor F(c*) takes a value from 0 to 1. In this graph, the weighting factor F(c*) is set to 1 for the range in which the values of chroma (c*) best represent flesh color. Outside of this range, the weighting factor F(c*) changes between 1 and 0 according to a monotonically increasing or monotonically decreasing function. The monotonically increasing or monotonically decreasing function is identical to that described for the weighting factor F(L*) for lightness (L*).

FIG. 3C is a graph showing a weighting factor F(h*) for hue (h*), where the X-axis represents hue (h*), and the Y-axis represents the weighting factor F(h*). The hue (h*) takes a value from 0 to 360 degrees. As with the weighting factor F(L*), the weighting factor F(h*) takes a value from 0 to 1. In this graph, the weighting factor F(h*) is set to 1 for the range in which the values of hue (h*) best represent flesh color. Outside of this range, the weighting factor F(h*) changes between 1 and 0 according to a monotonically increasing or monotonically decreasing function. The monotonically increasing or monotonically decreasing function is identical to that described for the weighting factor F(L*) for lightness (L*).

In other words, the weighting curve for chroma (FIG. 3B) includes a first section (the c* is in the range from 0 to approximately 40) in which the weighting factor F(c*)

increases monotonically from 0 to 1, a second section (the c* is approximately 40) defined at a value indicating flesh color (first specific color) in which the weighting factor F(c*) is 1, a third section (the c* is in the range from approximately 40 to 80) in which the weighting factor F(c*) decreases monotonically from 1 to 0, and a fourth section (the c* is in the range greater than approximately 80) in which the weighting factor F(c*) is 0. The weighting curve for hue (FIG. 3C) has a similar configuration.

As described above, with reference to the graphs in FIGS. 3A through 3C, the functions F(L*), F(c*), and F(h*) are provided as weighting factors for the three parameters lightness (L*), chroma (c*), and hue (h*). If a first specific color is flesh color and a second specific color is dyed-brown, then the flesh color index is calculated by multiplying all of the weighting factors. The flesh color index Hada(L*c*h*) can be defined by equation 1 as shown below.

$$Hada(L*c*h*)=F(L*)\times F(c*)\times F(h*) \quad \text{(equation 1)}$$

If the user-specified amounts of change in the lightness (L*), chroma (c*), and hue (h*) are represented by ΔL*, Δc*, and Δh*, and the values of lightness (L*), chroma (c*), and hue (h*) to be adjusted are L*, c*, and h*, then the amount of adjustment is found by multiplying the flesh color index by each amount of change: ΔL*×Hada(L*c*h*), Δc*×Hada (L*c*h*), and Δh*×Hada(L*c*h*). If the adjusted lightness (L*), chroma (c*), and hue (h*) are represented by L*', c*', and h*', then these values can be found from equations 2, 3, and 4 as shown below, respectively.

$$L*'=L*+\Delta L*\times Hada(L*c*h*) \quad \text{(equation 2)}$$

$$c*'=c*+\Delta c*\times Hada(L*c*h*) \quad \text{(equation 3)}$$

$$h*'=h*+\Delta h*\times Hada(L*c*h*) \quad \text{(equation 4)}$$

The printer 1 is configured to allow the user to set the amounts of change ΔL*, Δc*, and Δh* for each of the parameters lightness (L*), chroma (c*), and hue (h*). The printer 1 then performs a printing operation after correcting the values of the parameters lightness (L*), chroma (c*), and hue (h*) as described above based on the amounts of change ΔL*, Δc*, and Δh* set by the user, when the specific color correcting program 4a is executed.

Figure 4A:
FIG. 4A is an explanatory diagram showing a sample image of dyed-brown hair.
Figure 4B:
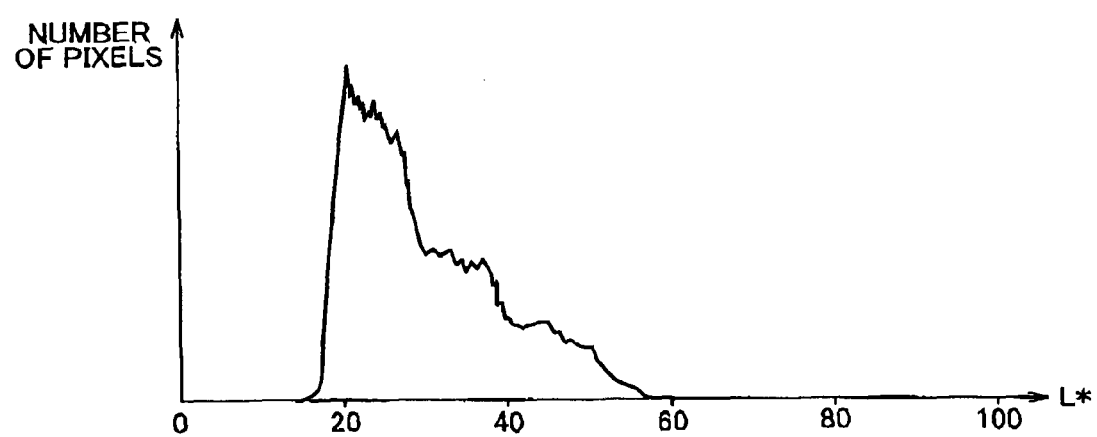
FIG. 4B is a histogram on the lightness of the sample image in FIG. 4A generated by counting the number of pixels corresponding to each lightness value.

FIGS. 4A and 4B illustrate the distribution of lightness (L*) for dyed-brown. FIG. 4A is a sample image conceptually showing a portrait of a person with dyed-brown hair taken by a digital camera or the like with all but the dyed-brown hair removed. FIG. 4B is a histogram showing the number of pixels rendered for each value of lightness (L*), for pixels in the image shown in FIG. 4A. As can be seen from the histogram, the number of rendered pixels is greatest for values of lightness (L*) of approximately 20. Hence, the weighting factor is set to 1 for values of lightness (L*) of approximately 20 (point B), as indicated in FIG. 3A.

Similarly, while not shown in the drawings, a histogram for flesh color created after removing all but the facial skin portions of the image reveals that the number of rendered pixels is greatest when the lightness (L*) is approximately 80. Hence, the weighting factor is set to 1 for values of lightness (L*) of approximately 80 (point C), as shown in FIG. 3A.

Similar histograms can be created for chroma (c*) and hue (h*) to find values having the largest number of pixels rendered in flesh color and dyed-brown. It is found that, for each of chroma (c*) and hue (h*), the largest number of rendered pixels for both flesh color and dyed-brown occurs at nearly the same value.

Figure 5:
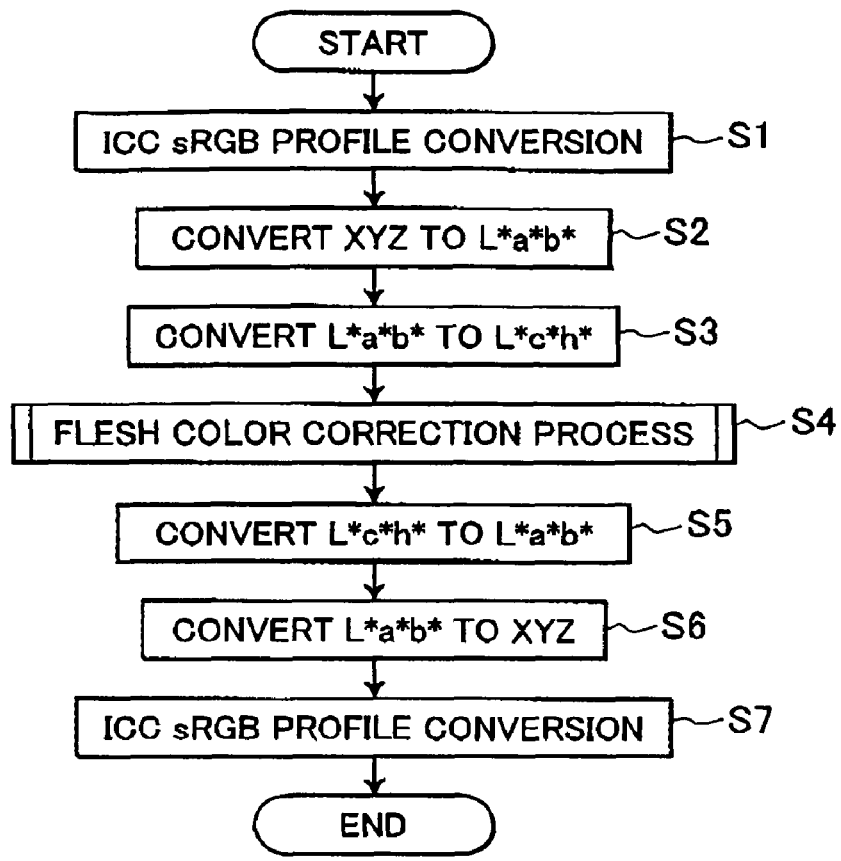
FIG. 5 is a flowchart illustrating steps in a specific color adjusting process.

FIG. 5 is a flowchart illustrating steps in a process according to the specific color correcting program 4a. This process (specific color adjusting process) will be described for a case in which image data formed in the three RGB values is inputted from the external medium 40 mounted in the external media slot 6 and converted to R'G'B' values with a corrected flesh color.

The specific color adjusting process (specific color correcting process) according to the present disclosure is executed when the user selects "Flesh color adjustment (Flesh color correction)" on the personal computer 20 or on the printer 1, for example.

At the beginning of this process in S1, the CPU 2 first converts the RGB values to XYZ values through the ICC SRGB profile conversion. While it is generally preferable to use the ICC profile for the monitor or for the digital camera being used, the ICC sRGB profile is used here for simplification. The ICC profile is a color conversion file format describing color characteristics of the devices stipulated by the ICC (International Color Consortium). Further, sRGB is a standard color space for monitors developed to standardize the RGB color reproducibility and color space on different devices. In S1 the PGB values are converted to XYZ values while referencing the ICC sRGB profile.

In S2 the CPU 2 converts the XYZ values found in S1 to L*a*b* values. This conversion is performed using the method well known in the art. In S3 the CPU 2 finds L*c*h* values from the L*a*b* values. In this case, the L* value is left unchanged, and the c* and h* values are found by computing the following equations 5 and 6.

$$c^* = \sqrt{(a^*)^2 + (b^*)^2} \quad \text{(equation 5)}$$

$$h^* = \left(\arctan\frac{b^*}{a^*}\right)\times \frac{180}{\pi} \quad \text{(equation 6)}$$

In S4 the CPU 2 performs a process to correct the flesh color based on these L*c*h* values. The flesh color correction process is described later with reference to FIG. 6. The flesh color correction process produces the corrected values L*', c*', and h*'.

Beginning from S5, the conversions performed in S1, S2, and S3 are reversed. In other words, in S5 the CPU 2 finds L*a*b* values corresponding to the corrected L*', c*', and h*'. In S6 the CPU 2 finds XYZ values corresponding to these L*a*b* values. In S7 the CPU 2 finds corrected R'G'B'values through the ICC sRGB profile conversion.

In this way, the printer 1 converts the inputted RGB values to R'G'B' values corrected for flesh color. The corrected R'G'B' values are converted to CMYK values according to the color conversion program 4c, and the printer 1 performs a printing process based on these CMYK values according to the print control program 4d.

Figure 6:
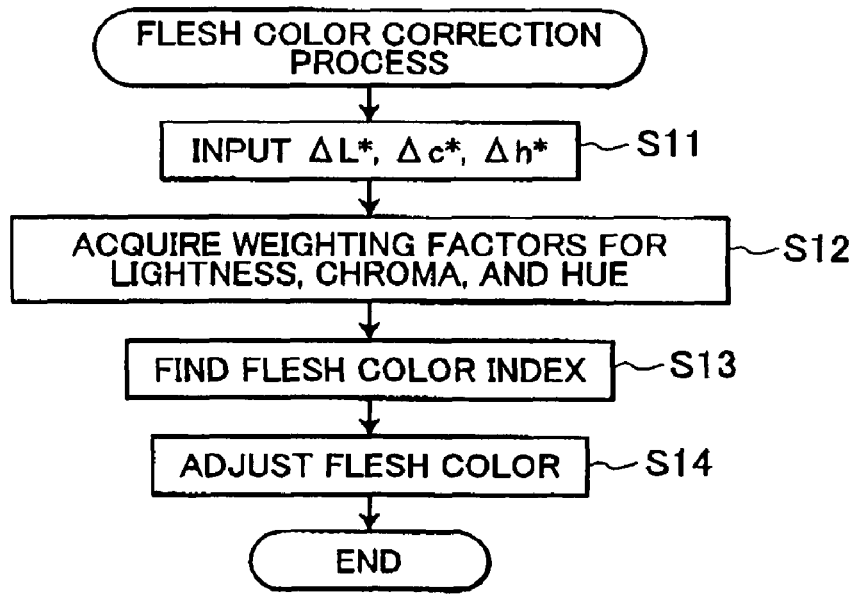
FIG. 6 is a flowchart illustrating steps in a flesh color correction process.

FIG. 6 is a flowchart illustrating steps in a flesh color correction process performed in S4 of FIG. 5. In S11 of the flesh color correction process, the user inputs amounts of change ΔL*, Δc*, and Δh*. In S12 the CPU 2 references the weighting curves 4b stored in the ROM 4 to find the weighting factors F(L*), F(c*), and F(h*) corresponding to the L*, c*, and h* found in S3 of FIG. 5. In S13 the CPU 2 multiplies each of the weighting factors using equation 1 to find the flesh color index Hada (L*, c*, h*).

In S14 the CPU 2 multiplies the user-specified amounts of change ΔL*, Δc*, and Δh* by the flesh color index using equations 2, 3, and 4 and adds these products to the original values for lightness (L*), chroma (c*), and hue (h*) to obtain the corrected values lightness L*', chroma c*', and hue h*'.

In the first aspect described above, the weighting factor is set to 1 for lightness (L*) within the range of values specifying the flesh color as the first specified color and dyed-brown as the second specified color and sets the weighting factor outside this range at values less than 1. Further, the weighting factor for chroma (c*) and hue (h*) is set to 1 for flesh color, while the weighting factor is set less than 1 for all other colors.

The amount of adjustment is computed by multiplying the specific color index, which is a product of all weighting factors, by the amount of change specified for each of the parameters lightness (L*), chroma (c*), and hue (h*). Hence, if the weighting factor for the specific color is great, then the weighting factors for colors adjacent to the specific color are set gradually smaller, thereby preventing colors adjacent to the specific color from being adjusted excessively when correcting the specific color. When the amount of adjustment is excessive, an operation to set the amount of change must be performed repeatedly. However, by preventing an excessive amount of adjustment, this method can improve the efficiency of the adjustment operation.

In the conventional method of adjusting flesh color for portraits of people with dyed-brown hair, there is a strong tendency for the hair color to appear with a red tinge. However, the method of the present disclosure can adjust the flesh color and hair color in harmony.

Next, an image processing device, an image processing program, and an image processing method according to a second aspect of the invention will be described. Portions of the second aspect that are identical to the first aspect will not be described; only portions different from the first aspect will be described below. In the first aspect described above, the weighting factor for lightness (L*) is set to 1 when the lightness (L*) is within the range of values indicating flesh color as the first specific color and dyed-brown as the second specific color and is set to a value less than 1 outside of this range. The weighting factors for chroma (c*) and hue (h*) are set to 1 for flesh color and set to a value less than 1 for all other colors. Adjustment amounts are then calculated by multiplying the amounts of change for each of the parameters lightness (L*), chroma (c*), and hue (h*) by the specific color index obtained by multiplying all these weighting factors.

Hence, when adjusting the flesh color, the dyed-brown color, which is similar to flesh color but has a lower lightness, is also adjusted. However, although the flesh color is satisfactorily adjusted, the dyed-brown adjustment may be insufficient. Said another way, adjusting the dyed-brown color satisfactorily may result in excessive adjustment of the flesh color. This trend is particularly noticeable when adjusting chroma. Therefore, in the second aspect, a restriction is placed on the amount of change made in the chroma of the specific color.

More specifically, a minimum value c*min serving as a limit for flesh color correction is set for the amount of chroma adjustment c*' obtained from equation 3. When the value of c*' is less than c*min, the adjustment amount is set to c*min. An adjustment limiting ratio Limit is set to a constant value (for example, Limit=0.7 for flesh color and Limit=0.3 for dyed-brown) such that c*min=c*×Limit.

By performing these settings, the minimum value c*min for flesh color is set to a larger value than the minimum value c*min for dyed-brown. Since the flesh color index is the same value for both flesh color and dyed-brown, when performing adjustments to reduce lightness and chroma, flesh color will reach the minimum value before dyed-brown and will not be corrected lower than this minimum value. Accordingly, by setting a limit to the amount of adjustment performed on the specific color, it is possible to effectively adjust dyed-brown without excessively adjusting the chroma of flesh color.

A specific example is given here. When chroma of both flesh color and dyed brown is c*=25, values c*min for flesh color and dyed brown are calculated as follows.

$$c^*\text{min} = c^* \times \text{Limit} = 25 \times 0.7 = 17.5 \quad \text{(flesh color)}$$

$$c^*\text{min} = c^* \times \text{Limit} = 25 \times 0.3 = 7.5 \quad \text{(dyed-brown)}$$

Further, when Δc*=−10 and Hada(L*c*h*)=1, chroma c*' for flesh color and dyed brown are obtained as follows.

$$c^{*\prime} = c^* + \Delta c^* \times Hada(L^*, c^*, h^*) = 25 - 10 \times 1$$
$$= 15 < 17.5 \quad \text{(flesh color)}$$

$$c^{*\prime} = c^* + \Delta c^* \times Hada(L^*, c^*, h^*) = 25 - 10 \times 1$$
$$= 15 > 17.5 \quad \text{(dyed-brown)}$$

Thus, flesh color reaches the minimum value before dyed-brown and is not corrected lower than the minimum value.

FIG. 7 is a flowchart illustrating steps in a flesh color correction process according to the second aspect. The process from S11 to S14 is identical to the flesh color correction process in FIG. 6 and will not be described here.

In S14 the CPU 2 finds the lightness L*', chroma c*', and hue h*' by multiplying the user-specified amounts of change ΔL*, Δc*, and Δh* by the flesh color index using equations 2, 3, and 4 and adding this result to the original values for lightness (L*), chroma (c*), and hue (h*). Next, in S15 the CPU 2 acquires the flesh color correction limit c*min for chroma (c*). Here, c*min is acquired by multiplying c* by the Limit as described above.

In S16 the CPU 2 determines whether the value of c*' found in S14 is smaller than c*min. If the value of c*' is less than c*min (S16: YES), then in S17 the CPU 2 sets the value of c*' to the value of c*min. When the value of c*' is set to c*min (S17) or when the value of c*' is greater than or equal to c*min (S16: NO), the flesh color correction process ends.

In the second aspect described above, an amount of adjustment is computed by multiplying the amount of change for each of lightness (L*), chroma (c*), and hue (h*) by the specific color index. However, a restriction is placed on chroma (c*) as a lower limit for the amount of adjustment obtained by multiplying the value of the chroma (c*) by a constant value. Therefore, the lower limit for chroma (c*) of flesh color is set greater than the lower limit for chroma (c*) of dyed-brown. Accordingly, it is possible to restrain the amount of adjustment to the chroma (c*) of flesh color when increasing the chroma (c*) of dyed-brown to prevent excessive adjustment to the chroma of flesh color.

In other words, according to the present aspect, a maximum value for the amount of adjustment is set by placing a restriction on chroma (c*). More specifically, the maximum value for the amount of adjustment is a difference between chroma prior to adjustment c* and c*min (i.e., the maximum value=c*−c*min). The value of chroma after adjustment c*' is determined such that the amount of adjustment does not exceed (is less than or equal to) the maximum value.

Next, an image processing device, an image processing program, and an image processing method according to a third aspect of the invention will be described with reference to FIGS. 8A and 8B. Portions of the third aspect that are identical to the first and second aspects will not be described; only portions different from the first and second aspects will be described below. In the second aspect described above, the amount of adjustment is calculated by multiplying the amounts of change in lightness (L*), chroma (c*), and hue (h*) by the specific color index, while a restriction is set for the amount of adjustment to the chroma (c*) by setting the product of the chroma (c*) and a constant value as a lower limit. In the third aspect, a constant value is not used, rather the lower limit is set to the product of the chroma (c*) and a function of lightness.

Specifically, the value of c*' is set to c*min when c*' is less than c*min, where the adjustment limiting ratio Limit is a function of lightness (L*), that is, Limit(L*), and c*min=c*×Limit(L*).

In the second aspect, the lower limit of chroma (c*) is set to the product of the value of chroma (c*) and a constant value. However, since the difference between the chroma (c*) of flesh color and the chroma (c*) of dyed-brown is not great, it may be sometimes difficult to ensure a sufficient difference between the adjustment amount for flesh color and the adjustment amount for dyed-brown. The third aspect utilizes the larger difference between the lightness (L*) of flesh color and dyed-brown and modifies the value of Limit based on the value of lightness (L*).

Figures 8A, 8B:
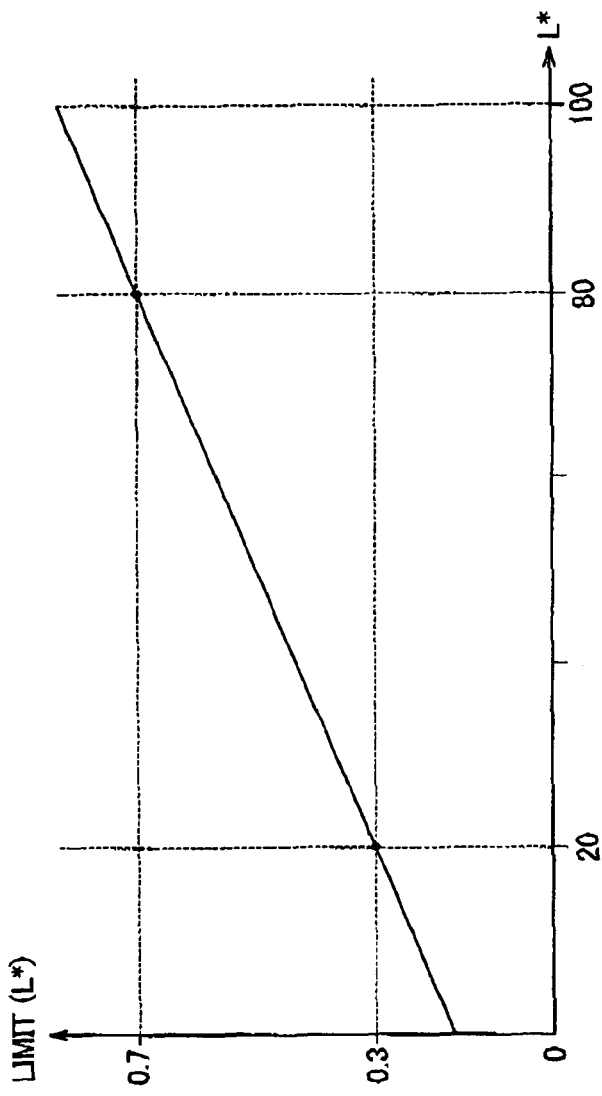
FIG. 8A is a table listing the RGB values for flesh color, a dark dyed-brown hair color, and a mainstream dyed-brown hair color; the lightness (L*) and chroma (c*) corresponding to these RGB values; the lightness (L*) and chroma (c*) after suitable correction; and the correction amount and compression ratio for chroma (c*)
FIG. 8B is a graph showing a limit (L*) as a function of lightness (L*) found from the table in FIG. 8A.

FIG. 8A is a table showing input data (RGB), lightness (L*) and chroma (c*) before correction, lightness (L*) and chroma (c*) after suitable correction, and the chroma correction amount and compression ratio for flesh color, dyed-brown close to black (dark dyed-brown), and mainstream dyed-brown color (mainstream dyed-brown). This is merely one example and may differ according to the viewer's subjectivity. While this data targets the skin color of the Japanese, even Japanese flesh tones differ according to age, area of residence, and sex. Further, when correcting photographic images, people have different preferences in how the images should be corrected.

In the table of FIG. 8A, the inputted RGB values are values within the range 0-255. The RGB values for flesh color are (240, 176, 144), for dark dyed-brown are (64, 48, 32), and for mainstream dyed-brown are (80, 48, 32). When converting this input data to lightness (L*) and chroma (c*), the lightness (L*) and chroma (c*) become 77.8 and 33.2 for flesh color, 19.8 and 16.3 for dark dyed-brown, and 22.4 and 24 for mainstream dyed-brown.

When appropriately corrected, the lightness (L*) and chroma (c*) become 82.8 and 22.7 for flesh color, 19.8 and 3.9 for dark dyed-brown, and 22.4 and 9 for mainstream dyed-brown.

Based on this data, it is apparent that the lightness (L*) is adjusted very little, while the chroma (c*) is greatly corrected. The hue (h*) has been omitted from this description since hue (h*), like lightness (L*), does not need correction.

The amount of correction for chroma (c*) is the difference between the value of chroma (c*) prior to correction and the value after correction, and the compression ratio for chroma (c*) is calculated by dividing the value of chroma (c*) after correction by the value of the chroma (c*) before correction. In this example, the amount of correction and the compression ratio are −10.5 and 0.68 for flesh color, −12.4 and 0.24 for dark dyed-brown, and −15 and 0.38 for mainstream dyed-brown. Hence, this data tells us that appropriate correction can be achieved by setting the compression ratio to approximately 0.7 for flesh color, having a lightness of approximately 80, and 0.3 for dyed-brown (both dark dyed-brown and mainstream dyed-brown), having a lightness of approximately 20.

This relationship is shown in FIG. 8B. FIG. 8B is a graph in which the X-axis represents lightness (L*), and the Y-axis represents Limit(L*). FIG. 8B shows the relationship between the lightness (L+) and Limit(L*) when the Limit(L*) is set to 0.3 for a lightness (L*) of 20 obtained in FIG. 8A and is set to 0.7 for a lightness (L*) of 80, whereby these points are connected by a straight line for all values in-between. This straight line can be represented by the following equations 7 and 8.

$$\text{Rate}=(80-L^*)/(80-20) \quad \text{(equation 7)}$$

$$\text{Limit}(L^*)=0.7\times(1-\text{Rate})+0.3\times\text{Rate} \quad \text{(equation 8)}$$

Hence, the Limit(L*) can be found by substituting the value of lightness (L*) into these equations.

The process used in the third aspect is the same as that in the second aspect, except that the value of Limit is replaced with Limit(L*). Accordingly, the flowchart representing this process is identical to that in FIG. 7.

Since the flesh color correction limit c*min is set based on the lightness (L*) in the third aspect described above, a limit can be placed on the amount of adjustment for flesh color and dyed-brown based on lightness (L*), which differs greatly between these colors. Accordingly, it is possible to prevent the chroma (c*) of flesh color from being greatly adjusted when a large adjustment is made in the chroma (c*) of dyed-brown, making it possible to adjust both colors in harmony.

Figure 9:
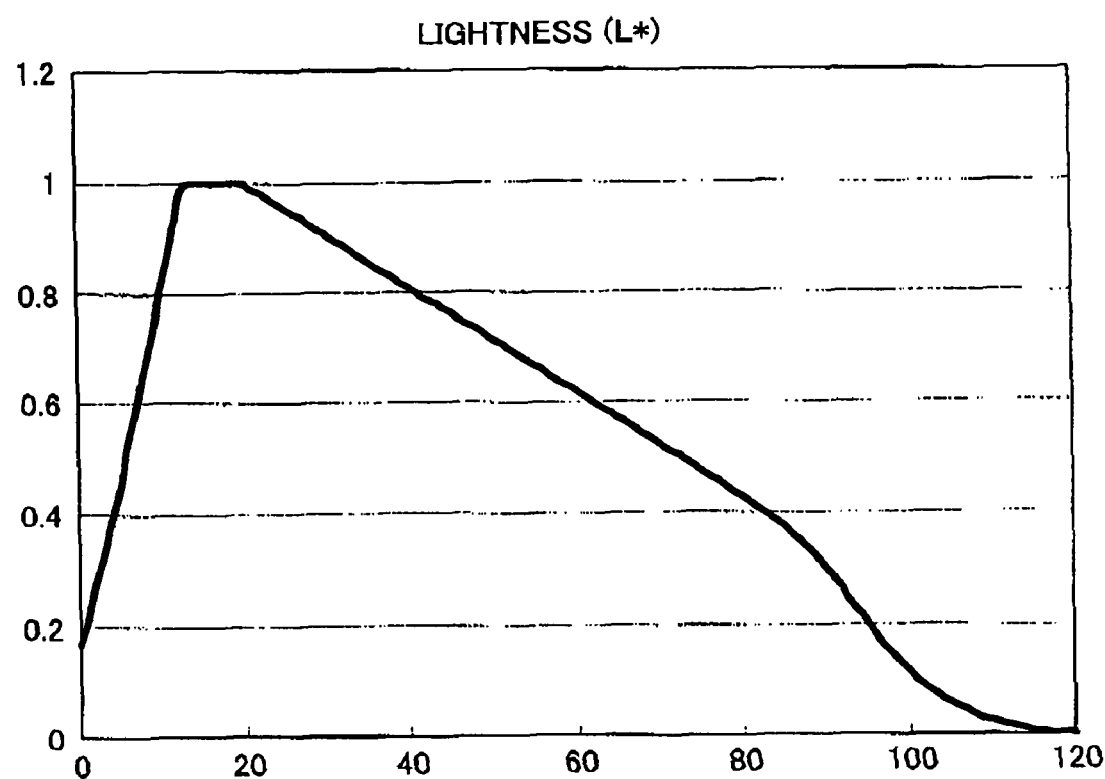
FIG. 9 is a graph showing a weighting factor for lightness according to a fourth aspect.

Next, an image processing device, an image processing program, and an image processing method according to a fourth aspect of the invention will be described with reference to FIG. 9. Portions of the fourth aspect that are identical to the first aspect will not be described; only portions different from the first aspect will be described below. In the second and third aspects described above, the amount of adjustment is calculated by multiplying amounts of change for each of the lightness (L*), chroma (c*), and hue (h*) by the specific color index, and placing a limit on the amount of adjustment for chroma (c*) by setting a lower limit equivalent to the product of the chroma (c*) and a constant (Limit) or a function of lightness (Limit(L*)). However, it is possible to set the amount of adjustment for flesh color smaller than that for dyed-brown, particularly with regard to chroma. Therefore, the weighting factor of lightness (L*) according to the fourth aspect is set as shown in the graph of FIG. 9. As shown in the graph, the weighting factor is set to 1 near values of 20 for the lightness (L*) that indicate a dyed-brown color. As the lightness value approaches 80, indicating flesh color, the weighting factor is set to a value smaller than 1 but larger than 0, such as 0.4 in this example. The weighting factor between these two regions describes substantially a straight line. In the region of lightness values from 0 to approximately 20, the weighting factor is formed by a monotonically increasing curve. In the region of lightness values greater than 80 the weighting factor is formed by a gradual monotonically decreasing curve.

In other words, the weighting curve for lightness includes a first section (the L* is in the range from 0 to approximately 20) in which the weighting factor increases monotonically from a value less than 1 (approximately 0.2 in this example) to 1, a second section (the L* is approximately 20) defined at a value indicating dyed-brown (second specific color) in which the weighting factor is 1, a third section (the L* is in the range from approximately 20 to 80) in which the weighting factor decreases monotonically from 1 to a predetermined value greater than 0 and less than 1 (approximately 0.4 in this example), a fourth section defined at a value indicating flesh color (first specific color) in which the weighting factor is the predetermined value, and a fifth section (the L* is in the range from approximately 80 to 120) in which the weighting factor decreases monotonically from the predetermined value (approximately 0.4 in this example) to a value less than the predetermined value (0 in this example).

The weighting factors for chroma (c*) and hue (h*) are identical to those in the first aspect. Further, the flesh color correction process performed in the fourth aspect is identical to that shown in FIG. 6 of the first aspect and will not be described here.

In the fourth aspect, the weighting factor for lightness (L*) is set to 1 for values of lightness (L*) indicating dyed-brown, and is set to a value smaller than 1 but greater than 0 for values of lightness (L*) indicating flesh color. Accordingly, the flesh color index for flesh color is set smaller than the flesh color index for dyed-brown, thereby reducing the adjustment amount for flesh color even when a large adjustment amount is set for dyed-brown, so that both colors can be adjusted in harmony.

While the invention has been described in detail with reference to the above aspects thereof, it would be apparent to those skilled in the art that various changes and modifications may be made therein without departing from the spirit of the invention.

For example, in the first aspect described above, the printer 1 first performs an ICC sRGB profile conversion to convert RGB image data inputted from external media into XYZ values, computes L*a*b* values from the XYZ values, and calculates L*c*h* values from the L*a*b* values. However, the printer 1 may also convert the RGB values directly to L*c*h* values by referencing a look-up table or employing a similar method.

Similarly, when converting the L*'c*'h*' values having the corrected flesh color to R'G'B' values, a direct conversion may be performed by referencing a look-up table or the like.

In the first aspect described above, the weighting factor is set to 1 for values of chroma (c*) and hue (h*) indicating flesh color, which is the first specific color. However, it is also possible to set the weighting factor to 1 for values of chroma (c*) and hue (h*) indicating dyed-brown, which is the second specific color, or for values of chroma (c*) and hue (h*) indicating both flesh color and dyed-brown. Since both flesh color and dyed-brown take similar chroma (c*) and hue (h*) values, both can be satisfactorily adjusted.

In the second and third aspects described above, a flesh color correction limit c*min is acquired for chroma (c*), and the adjusted value c*' is not allowed to drop below the flesh color correction limit cumin. However, in some cases it may be possible to correct lightness (L*) and hue (h*) using correction limits.

In the second and third aspects described above, a flesh color correction limit c*min is acquired for chroma (c*), and the adjusted value c*' is not allowed to drop below the flesh color correction limit c*min. However, it is also possible to ensure that the product of the amount of change $\Delta c^*$ and the flesh color index, $\Delta c^* \times Hada(L^*c^*h^*)$, does not exceed a predetermined value.

In the third aspect described above, a correction limit for chroma (c*) is set based on the value of lightness (L*), and a process is performed to set the amount of adjustment for flesh color less than that for dyed-brown by ensuring that the chroma (c*) for flesh color does not drop below the correction limit. However, an adjustment rate setting means is provided for setting an adjustment rate $\alpha(L^*)$ that changes according to the value of lightness (L*). In this case, the adjustment amount is modified by multiplying the adjustment amount by the adjustment rate $\alpha(L^*)$ set by the adjustment rate setting means. More specifically, the amount of adjustment is represented by $\Delta c^* \times Hada(L^*c^*h^*) \times \alpha(L^*)$, and the adjusted value of chroma is obtained by $c^{*\prime} = c^* + \Delta c^* \times Hada(L^*c^*h^*) \times \alpha(L^*)$.

What is claimed is:

1. An image processing device comprising:
an inputting portion that inputs image data of a color image, the image data being in a form of combinations of values for a plurality of base colors, the color image including a first specific color and a second specific color;
a converting portion that converts the image data inputted by the inputting portion to values of lightness, chroma, and hue;
an adjusting portion that adjusts the values of lightness, chroma, and hue converted by the converting portion, the adjusting portion comprising:
a change-amount setting portion that sets an amount of change for each of lightness, chroma, and hue to a corresponding one of parameters specified by a user;
a weighting-curve storing portion that stores weighting curves for each of lightness, chroma, and hue,
the weighting curve for lightness including a first section in which a weighting factor increases monotonically from a value less than one to one, a second section defined at a value indicating the second specific color in which the weighting factor is one, a third section in which the weighting factor decreases monotonically from one to a predetermined value greater than zero and less than one, a fourth section defined at a value indicating the first specific color in which the weighting factor is the predetermined value, and a fifth section in which the weighting factor decreases monotonically from the predetermined value to a value less than the predetermined value, wherein the first section, the second section, the third section, the fourth section, and the fifth section are sequentially continuous,
the weighting curve for each of chroma and hue including a first section in which the weighting factor increases monotonically from zero to one, a second section defined at a value indicating either the first specific color or the second specific color in which the weighting factor is one, a third section in which the weighting factor decreases monotonically from one to zero, and a fourth section in which the weighting factor is zero;
a weighting-factor determining portion that determines, based on the weighting curves, weighting factors for the values of lightness, chroma, and hue converted by the converting portion;
a specific-color-index determining portion that determines a specific color index by multiplying the weighting factors by each other; and
an adjustment-amount determining portion that determines an adjustment amount by multiplying, by the specific color index, the amount of change set by the change-amount setting portion, and that determines adjusted values of lightness, chroma, and hue based on the adjustment amount; and
an adjusted-color-image obtaining portion that obtains an adjusted color image based on the adjusted values of lightness, chroma, and hue determined by the adjusting portion.

2. The image processing device according to claim 1, wherein the first specific color is flesh color, and the second specific color is brown color having a lower lightness than flesh color.

* * * * *

UNITED STATES PATENT AND TRADEMARK OFFICE
CERTIFICATE OF CORRECTION

PATENT NO. : 8,144,982 B2
APPLICATION NO. : 11/492005
DATED : March 27, 2012
INVENTOR(S) : Yasunari Yoshida et al.

It is certified that error appears in the above-identified patent and that said Letters Patent is hereby corrected as shown below:

Title Page, between Section 65 and Section 51, please add the following Section 30:

Foreign Application Priority Data
Jul. 25, 2005 (JP) ......................... 2005-213752

Signed and Sealed this
Twenty-sixth Day of June, 2012

David J. Kappos
*Director of the United States Patent and Trademark Office*